Aug. 16, 1960    D. J. CAMPBELL    2,949,161
REVERSIBLE DISC PLOW AND REAR WHEEL SYSTEM
Filed Aug. 31, 1955    4 Sheets-Sheet 1
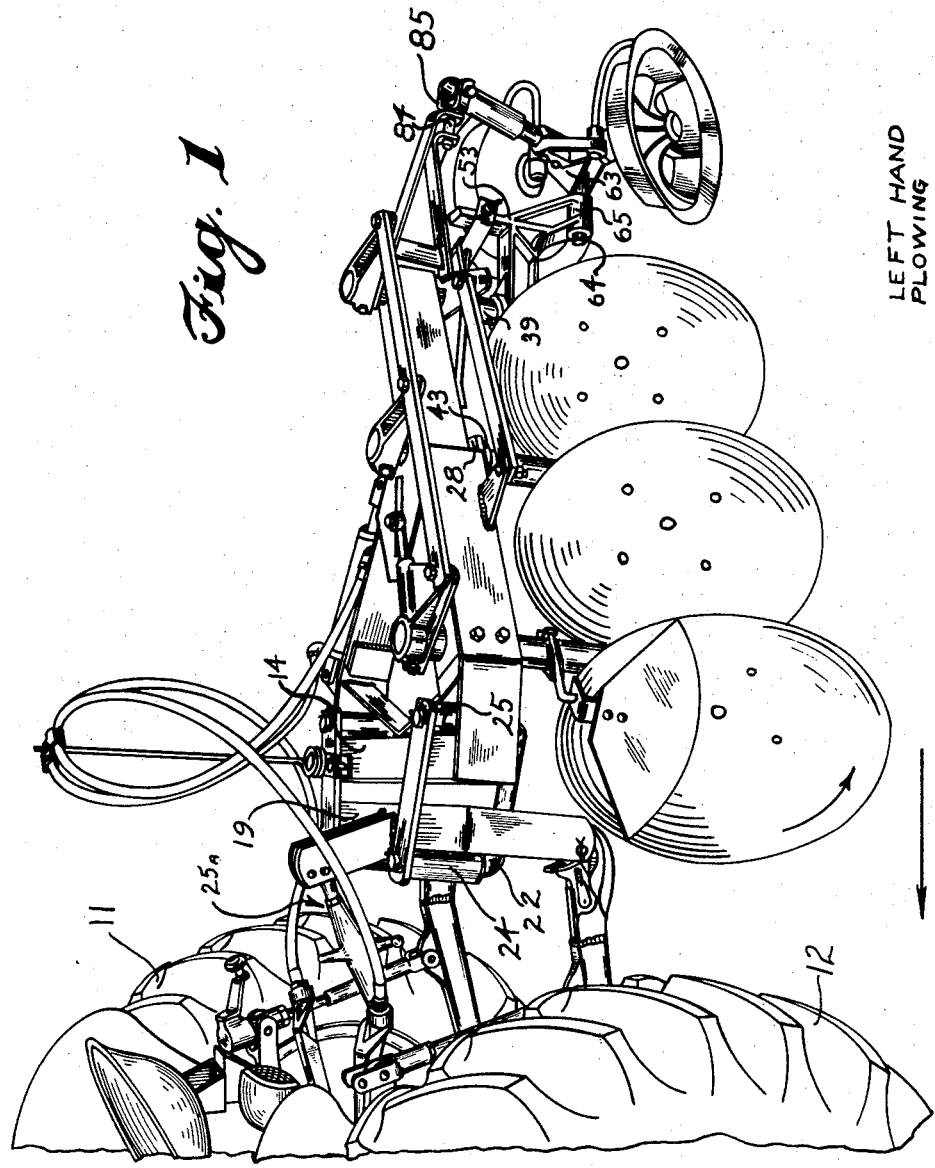
Inventor
Donald J. Campbell
By:
Soans, Glaister, & Anderson
atty's.

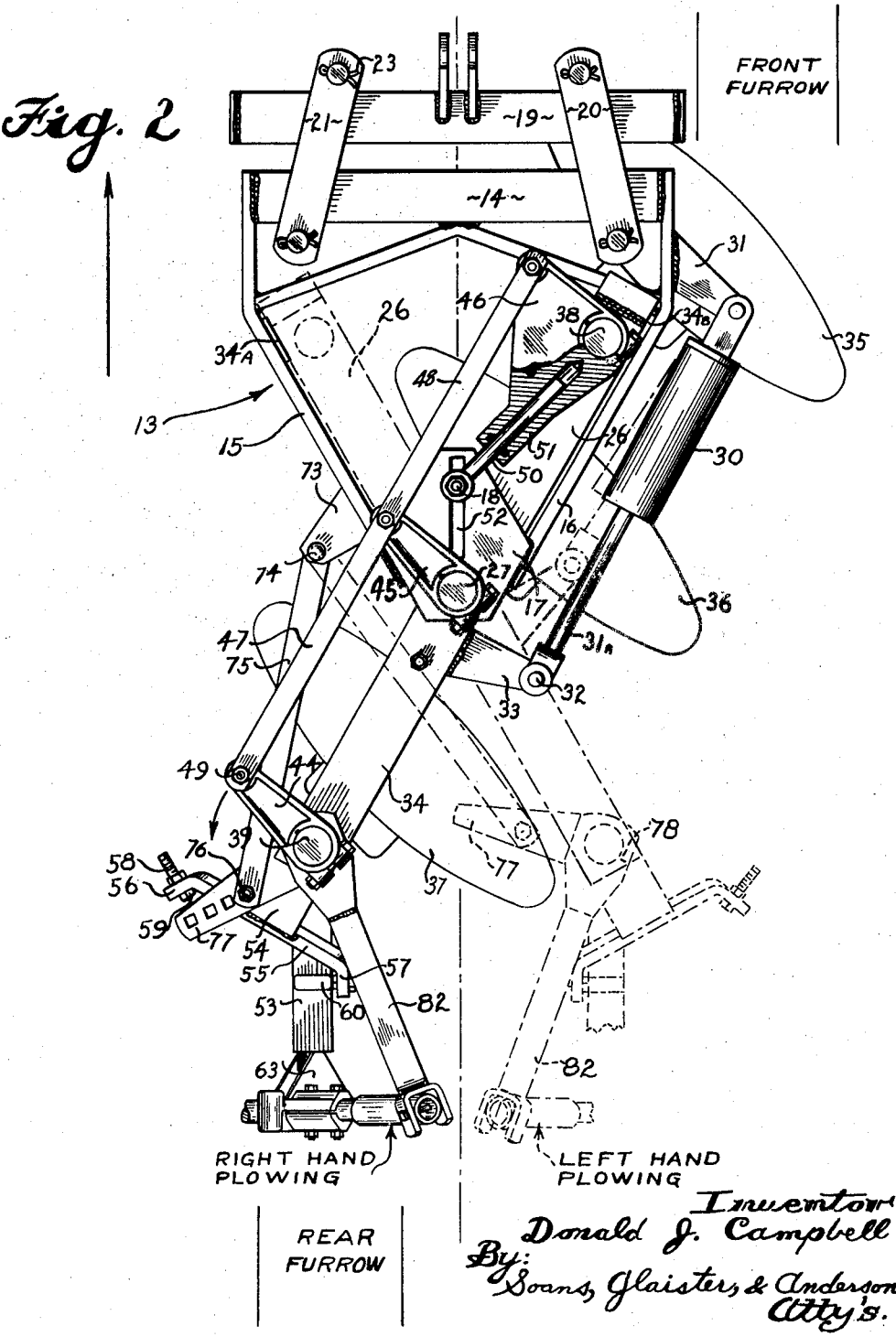

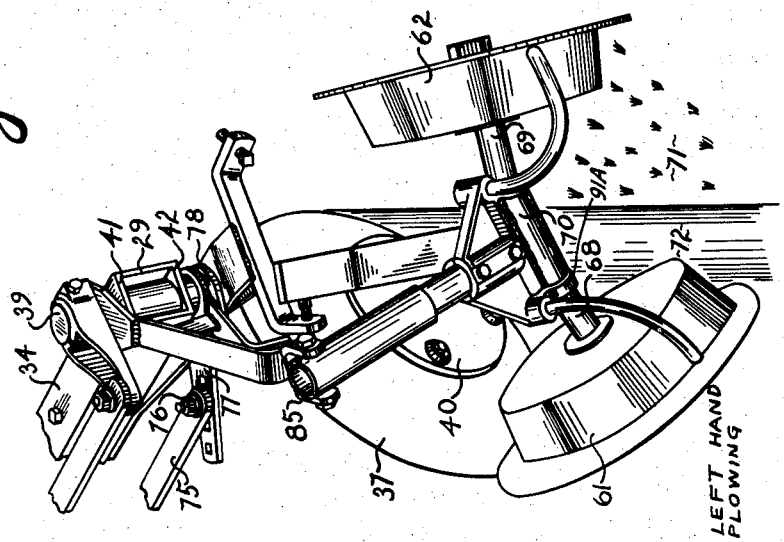
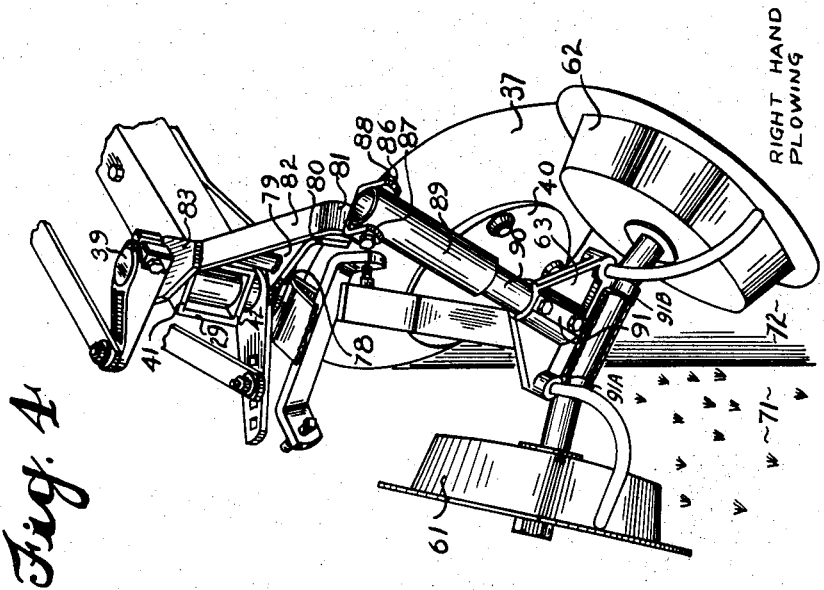

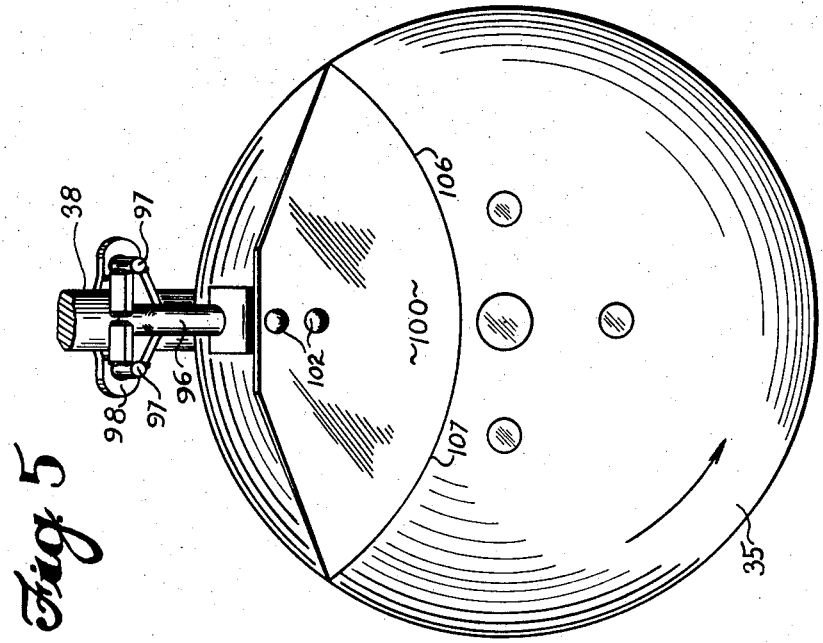
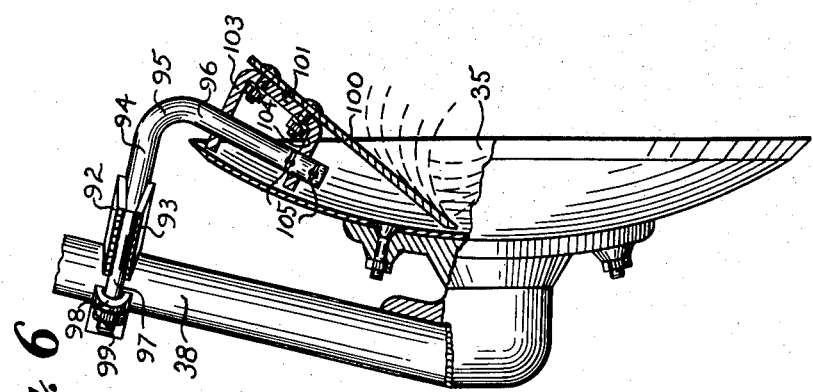

United States Patent Office 2,949,161
Patented Aug. 16, 1960

2,949,161

REVERSIBLE DISC PLOW AND REAR WHEEL SYSTEM

Donald J. Campbell, Stockton, Calif., assignor to J. I. Case Company, Racine, Wis., a corporation of Wisconsin Filed Aug. 31, 1955, Ser. No. 531,715

7 Claims. (Cl. 172—212)

This invention relates to reversible disc plows with reversible rear wheel system, especially the type carried and propelled by tractors, and has particular value in connection with reversible plows such as are described in U.S. Patent to Brown No. 1,127,179, issued February 2, 1915.

In plowing with discs, the side pressure upon the discs is towards the land (the unplowed ground) and is unbalanced, usually requiring a special type of rear wheel and other expedients for preventing the implement from swinging toward the land side due to the unbalanced side pressure. This tail wheel is usually carried on a stub axle or bearing, the axis of which is usually inclined at an angle to the horizontal, and the rim of the wheel generally is in contact with the solid shoulder on the land side of the furrow made by the rear disc.

In plowing with a reversible disc plow, when the angle of the discs is reversed in changing the direction of plowing, the side thrust is also reversed. Furthermore, the implement should be capable of giving equally good results when plowing in either direction. These requirements or conditions introduce considerable difficulty in regard to the design and operation of the implement and particularly the rear wheel system.

In order to avoid the complications arising from offsetting the center line of the plowing zone, I prefer to follow the regular practice of running one of the tractor driving wheels in the front furrow. Since the other driving wheel rides on the land, the tractor will be tilted away from the land, whereas it is desirable that the discs shall all operate at the same level or depth. When reversing the plow, the tilt is also reversed.

One of the principal objects of the invention is to provide a rear wheel system which will function equally well for an implement of the class described no matter whether the discs are angled to plow left-hand or right-hand.

A further object is to provide a rear wheel system which is automatically adjusted to the correct position in accordance with the adjustment of the plowing discs.

A further object is to provide a front connection to the tractor which will assume a share of the side thrust of the discs and transmit it to the tractor in such a manner as to avoid interference with steering thereof.

Another object of the invention is to provide a disc scraper which will automatically adjust itself to proper scraping relationship with the rotating disc regardless of the direction of rotation of the disc.

Further objects of the invention are to provide an improved reversible implement of the character described, which in all important respects can be adjusted by the operator of the tractor without requiring the operator to descend from his seat.

In order to accomplish the principal objects of the invention in a simple and practical manner, I have found it to be desirable to arrange the ground-engaging discs and the rear wheel system in such a way that when plowing in either direction each of them has substantially the same spacing relative to the longitudinal center line of the implement and that this center line, although not necessarily fixed relative to the longitudinal center line of the motive power, if movable relative to the motive power center line, should have substantially the same spacing relative to the motive power center line when plowing in either direction.

Furthermore, in view of the fact that the rear wheel system acts in a sense as a depth gauge and supports the tail end of the implement and also serves to resist the side thrust of the discs, the resultant of these forces is in a line which is inclined at an angle between vertical and horizontal. Hence I have found it to be highly desirable that the rear wheel system should also be inclined, should be symmetrical, and so arranged that when plowing in either direction, the resultant force acting upon the rear wheel system, which force is substantially the same and at the same angle although oppositely inclined, will be resisted in an equally efficient manner in either direction by the rear wheel system. I accomplish this desirable result by employing a symmetrical wheel system, preferably having two elements, each element alternately rolling upon the land or in the rear furrow, depending upon the plowing direction, with the axes of the rolling elements arranged substantially or approximately at right angles to the line of draft regardless of the plowing direction. When reversing the plowing direction, this wheel system as a unit is rocked on a longitudinal axis so as to reverse the inclination of the wheel system.

In the drawings accompanying this application and illustrating a preferred embodiment of the invention, I have shown a tractor-drawn three-disc plow in which the invention is incorporated.

Fig. 1 is a perspective view of the implement looking toward the land side of the plow, with scrapers removed, and arranged for left-hand plowing;

Fig. 2 is a plan view of the implement, the full lines showing it arranged for right-hand plowing;

Fig. 3 is a perspective view partly in section of the rear wheel system looking in the direction of draft from the rear of the implement when the latter is in the position for left-hand plowing, as shown in Fig. 1 and as shown in dotted lines in Fig. 2;

Fig. 4 is a view similar to Fig. 3 but showing the rear wheel system arranged for right-hand plowing as shown in full lines in Fig. 2;

Fig. 5 is a front view of one of the discs showing the scraper in place; and

Fig. 6 is a side view, partly in section, of the disc and scraper shown in Fig. 5.

Referring to the drawings, it will be seen from Fig. 1 that the motive power for the implement is a tractor having a pair of driving wheels 11 and 12. In Fig. 1 the tractor is shown as being hooked up to a reversible disc plow arranged for left-hand plowing, i.e. to throw the dirt to the left, and when so arranged, the left wheel 12 of the tractor runs in the front furrow while the right wheel 11 of the tractor runs on the land so that there is a slight tipping of the tractor away from the land and toward the plowed ground. In this instance with left-hand plowing, the front furrow is on the left of the implement. When reversed for right-hand plowing, as shown in full lines in Fig. 2, the front furrow is at the right of the implement.

As hereinbefore stated, the tractor travels with one wheel in the last plowed furrow and therefore travels in a position slanted somewhat toward the plowed land. Furthermore, as will presently appear, the plow as a whole partakes of the slant of the tractor, and in order that the furrows formed by the individual discs may be of even depth, the plow standards to be presently described are chosen of such length that the several discs will penetrate to the same depth regardless of the slant of the frame.

The main frame of the plow, designated as a whole 13, is made of structural steel members symmetrically assembled in respect of the line of draft, and including a front cross bar 14 with rearwardly converging side bars 15 and 16 secured at their front ends to the cross bar 14 and secured together at their rear ends by a horizontal plate member 17 having an upwardly projecting stud 18 thereon for a purpose which will hereafter appear.

In front of the cross bar 14 and spaced therefrom as shown in Fig. 1, there is another cross bar 19 which has a floating connection with the cross bar 14 of the main frame of the implement. Said floating connection between parts 14 and 19 includes spaced symmetrically arranged links 20 and 21 which converge at their forward ends. These links 20 and 21 are apertured at their ends to receive the upper ends of pairs of similar U-bolts, one of which is indicated at 22 in Fig. 1. These U-bolts are prevented from dropping down from the links 20 and 21 by means of cotter pins such as indicated at 23. The ends of the U-bolts are thus secured in the links 20 and 21 and reenforced against the considerable pull of the tractor, and their vertical arms or legs are pivotally supported in small axially vertical sleeves as indicated at 24 and 25 in Fig. 1, which are welded or otherwise securely fixed respectively to the front face of the front cross bar 19 and the rear face of the rear cross bar 14.

By swinging of the links 20 and 21 and their respective U-bolts, cross bar 14 may be displaced from side to side relatively to cross bar 19, and, owing to the converging relation of links 20 and 21, will at the same time be given a side to side rocking motion, the effect approximating the action which would take place if cross bar 14 were pulled by a much longer single drawbar rigid with cross bar 14. In fact the effect is virtually identical with that of such a rigid drawbar pivoted to the tractor at the point where links 20 and 23 would intersect if projected sufficiently. In the present instance this point is chosen as at the center of the tractor rear axle and, in accordance with well-known mechanical principles common to linkages of this kind, not only does cross bar 14 swing as if connected by a rigid drawbar to this imaginary point, but any share of the side thrust of the plow which appears on cross bar 14 will be applied in similar manner to said imaginary point assuming cross bar 19 to be carried on the tractor and secured against side to side movement. As will be apparent, the tractor can readily withstand any such side thrust applied at the center of the rear axle without any tendency to affect the steering of the tratcor one way or the other. In this way any "side draft" effect of the plow on the tractor is eliminated.

The floating cross bar 19 may be connected to the tractor by a type of hitch such as is described in the Ferguson patents, Nos. 1,916,945 and 2,223,002, although in the present instance I have shown a hitch sold under the trademark "Eagle" by the J. I. Case Company, my assignee, and which is described in pending U.S. patent application Serial No. 165,066, filed by Evans L. Clarke, now U.S. Patent No. 2,865,657, issued December 23, 1958, and owned by said J. I. Case Company, my assignee. Inasmuch as the said "Eagle" hitch is well-known to operators of tractor-drawn implements, it is not necessary for me to describe it in detail. It is sufficient to say that any hitch of the general type indicated will be satisfactory as the motive power for my improved disc plow, it being understood that hitches of the type mentioned will be characterized or adjusted for this purpose not to permit any appreciable amount of yawing or hunting action from side to side. Also, as is common, such hitches allow up and down pivotal movement at an imaginary hitching point forward of the actual connection so that the implement and the tractor may accommodate themselves to the contour of the ground, the weight of the front portion of the plow being imposed on said imaginary point so as to be supported by the tractor, and whereby the tractor acts as a gauging means to control the depth of plowing at the front end of the plow. Such hitches are commonly provided with means for adjusting the running height of an attached implement, in the present instance a turnbuckle assembly 25a, and power actuated mechanism not shown and forming no part of the invention, for swinging the hitch upwardly for raising attached implements into inoperative or transport position.

In view of the substantial strength and ruggedness of U-bolts 22 in combination with links 20 and 21, cross bars 19 and 14 are in effect substantially rigidly connected together insofar as up-and-down displacement or pivotal movement is concerned although of course they are free for side-to-side movement by swinging of the links as heretofore explained, and therefore upward swinging of the hitch by said power actuated mechanism will result in bodily lifting the plow clear of the ground in rearwardly projecting relation to the tractor for ready transportation from place to place.

As shown best in Fig. 2, the rear ends of the converging frame elements 15 and 16 are cut away to accommodate the central pivotal portion of the plow beam 26. The plow beam 26 extends under the yoke plate 17 and is pivoted axially of and adjacent the upper end of the disc plow standard or pivot shaft 27. Cocking of the pivot shaft 27 is prevented by another yoke plate indicated at 28 in Fig. 1, extending between the lower edges of the ends of the frame pieces 15 and 16, the plates 17 and 28 being spaced apart sufficiently to accommodate the depth of the plow beam 26 which in the present instance is in the form of a square tube, for maximum strength, as shown at 29 in Fig. 3.

The plow beam 26 pivots freely relatively to the shaft 27 of the central disc standard, and the structure also forms a pivotal support for said disc standard 27 which may be required to assume a different angular position in the plow beam depending upon the direction of plowing, so that the plow discs will be properly presented to the ground being plowed.

When reversing the plow, the swinging of the plow beam 26 on its pivot 27 so as to position the gang of discs for either right-hand or left-hand plowing at the option of the operator, is effected by a hydraulic cylinder or motor unit 30, the front end of which is pivoted to an arm 31 welded to one side of the main frame of the implement. The end of the piston rod 31a of the hydraulic cylinder is pivotally connected at 32 to a small bracket or lug 33 welded to the rearwardly extending rear end or arm 34 of the plow beam 26. By extending or withdrawing the piston attached to rod 31a in cylinder 30, the operator can swing the plow beam 26 around the central pivot 27 into either the full-line position shown in Fig. 2 or the dotted-line position shown in said Fig. 2, and which dotted-line position represents the condition of the implement as shown in Fig. 1. Stops 34A and 34B fastened to the main frame elements 15 and 16 limit the swinging movement of the plow beam 26, and it is contemplated that other stops of different size or shape may be substituted as needed to alter the degree of swinging of beam 26, motor unit 30 being adapted to hold beam 26 firmly against one stop or the other, in accordance with the direction in which the plow is operating.

The said plow beam 26 in the present instance supports three plow discs 35, 36 and 37 which are supported respectively on the front standard 38, on the middle standard 27, which as previously described constitutes a pivotal connection between the plow beam and the main frame, and on the standard 39 in the rear end 34 of the plow beam. These discs 35, 36 and 37 are carried on saucer-shaped elements as indicated at 40 in Fig. 3, rotatably supported in tilted position upon suitable bearings on the lower ends of the vertical plow standards. These bearings being conventional, need not be described in detail.

In the present instance, the plow standards are each rotatable in the plow beam 26 and are held vertical against tipping forces by reason of the fact that each of the standards or vertical axles fits bearing apertures in the spaced upper and lower walls 41 and 42 of the plow beam. Suitable collars, not shown, fixed below one of the walls 41 or 42 of the plow beam 26 position the standards on the plow beam and a similar collar 43 fixed on the central standard 27 under the yoke plate 28, serves to position the standard 27 and restrain it against upward movement, beam 26 being retained between plates 17 and 28 and prevented thereby from being displaced upwardly or downwardly.

In order to enable the discs to operate to the best advantage, each disc should be properly angled so that a plane intersecting the center of the disc at right angles to the axis of the disc will have a definite angular relationship to the line of draft. This same condition or angular relation must exist when the plow is turning the earth in each of its two directions. Therefore, in reversing the plow it is necessary to reverse the angle of said plane. The angular rotation of the axis of the standard, relative to the furrow line or draft line, therefore should be twice the angle of said plane.

By setting the discs at right angles to the plow beam it would be possible to swing the plow beam symmetrically on either side of the center line an angular amount equal to the angle of inclination of the discs, but in some cases the discs might not plow well at such an angle. Therefore, in order to obtain the best results and to suit the requirements of all cases and swing the discs through the proper plowing angle in reference to the center line of the implement, and to provide as nearly as possible perfect symmetry of plowing, it has been found desirable to provide means for rotating the plow standards in the plow beam in addition to providing for the swinging of the plow beam on the main frame of the implement.

Since it is quite obvious that in plows having a plurality of discs, each of the discs should operate under like conditions, each of the shafts 38, 27 and 39, if to be rotated should be rotated the same amount and in unison in the plow beam 26 when the plow is reversed. In the present instance this is effected by fixing on the upper ends of the plow standards suitable arms or cranks 44, 45 and 46, the ends of which are connected by links 47 and 48 pivoted on the crank pins, for example 49 in the case of cranks 44, 45 and 46. The arms 44, 45 and 46 are the same effective length and their pivots are disposed at the same angle relatively to discs 37, 36 and 35, respectively so that the system of arms and links just described constitutes in effect a parallel linkage causing the plow standards 38, 27 and 39 at all times to rotate in unison and to the same degree in the plow beam 26.

Although various ways of rocking the plow standards and the plow beam may be employed, in the present instance I control the rotary movement of the standards in the beam 26 by means of hereinbefore mentioned pin 18 which is located at the center line of the implement and fixed in the main frame ahead of the standard 27. This pin 18 forms a pivot for the end of a rod 50, conveniently of circular cross section, which is arranged to slide in a hole drilled horizontally in a boss or hub 51 formed in the present instance as an integral part of the arm 46. The sliding movement of rod 50 in boss 51 merely serves to permit the distance between stud 18 and shaft 38 to change slightly when the plow beam 26 swings from one position to its other position.

It will be understood that the arrangement just described will cause the standards 38, 27 and 39 to rotate slightly in counterclockwise direction in the beam 26 when the beam is swung from its full-line to its dotted-line position as shown in Fig. 2, and similarly in a clockwise direction when it is swung back from its dotted-line to its full-line position. In the present instance the angle of the plow beam to the line of draft is substantially less than the angle of the disc relative to the line of draft and, therefore, it is necessary to supplement the angle of rotation of the standards due to the swinging of the plow beam on the main frame. The pin 18 is located ahead of the shaft 27 so that this result may be obtained.

If for any reason a change in condition of the implement or in the plowing conditions requires a different degree of angling of the disc relative to the furrow, the distance of the stud 18 from the plow beam pivot 27 may be adjusted by moving it along the slot 52, so as to fix it in a new position until another change of conditions occurs. Any conventional clamp or lock nut may be employed for locking pin 18 at any position in slot 52.

Usually in a reversible disc plow of the general type here involved, the rear furrow or the shoulder of the rear furrow will approximate a position on a line extending back along the path of travel of the plow and behind the rear disc standard, usually displaced therefrom somewhat toward the land, and in most cases the rear wheel of the implement should be located approximately to the rear and in line with the standard or the center of the disc supported by the standard so as to run in the furrow produced by the rear disc. For this reason, where the pivotal point of the plow beam is located at the approximate location of the rear disc standard, the furrow or the shoulder of the rear furrow will be back of and in a line with or somewhat toward the land from the plow beam pivot. In such case, with certain types of reversible rear wheel systems the frame of the plow may be extended rearwardly to form a support for the rear wheel system. However, where the rear disc is located on an arm of the plow beam extending rearwardly of the plow beam pivot, the rear furrow line will be substantially offset laterally from the center line of the implement and, hence, in that case if it is desired to use a reversible rear wheel system of a type such as will later be described, a similar lateral offsetting of the rear wheel system may be required so as to bring it in correct relation with the rear disc standard.

In the present case where this offset condition exists, the reversible rear wheel system is carried by a mounting 53 (see Fig. 2) which takes the form of a casting, the front end of which, as shown in Fig. 1, is pivotally mounted on the shaft of the plow standard 39 so that this mounting is enabled to swing laterally in a horizontal plane on a vertical axis coinciding with the vertical axis of the rear plow standard 39.

Suitable stop means are employed to keep the mounting 53 at a desired angle with the center line of the implement when the mounting 53 swings on its axis relative to the plow beam when reversing the direction of plowing. It will be understood that the plowing operation tends to swing the tail end of the implement in the direction of the land so that there is no need to provide any power connections for shifting the mounting 53 when changing the direction of plowing and in practice it has been found usually desirable to prevent mounting 53 from swinging far enough to reach a position parallel to the above-mentioned furrow shoulder, the mounting and wheel system carried by it being angled slightly in the direction of the furrow for a purpose to appear. Stop means are provided to prevent too great a movement of the mounting 53 on its vertical axis, and to determine positions of the mounting for desired results.

As shown in the drawings, on the rear end of the plow beam there is a short extension 54 and across the end of this extension there is welded a short cross bar 55, the ends of which are bent at an angle as shown at 56 and 57. The bent ends 56 and 57 serve as supports for adjustable screws such as shown at 58, the inner heads of which 59 constitute adjustable stops or abutments. These abutments 59 cooperate alternately with the opposite side edges of an upwardly extending arm or finger 60 formed as an integral part of the mounting 53 to limit the pivotal movement of the mounting on its vertical axis.

An important feature of my invention resides in the reversible rear wheel system and its connections to the implement. My rear wheel system is so organized and constructed that the axis of the rolling system is at all times approximately although not necessarily exactly perpendicular to the line of draft so as to secure an efficient rolling action in either plowing direction, and also the effective axis of the rolling system is perpendicular to a line which is as nearly as feasible parallel with the direction of the force acting upon the rear wheel system and the components of which are the weight of the implement and the side thrust due to the plowing operation.

When reversing the plow the inclination of the resultant force is reversed and it is necessary to make a corresponding reversal of the rear wheel system without losing any of the advantages to which reference has been made. This I accomplish by mounting the rear wheel system on a longitudinal axis extending in the direction of the line of draft and by providing means for automatically rocking the wheel system on the latter axis when reversing the direction of plowing. To this end, the rear wheel system, which in the present instance includes a pair of separate wheels 61 and 62 (see Fig. 4), is mounted symmetrically to rotate on a rocker 63 adapted to rock upon a substantially horizontal axis which at all times is longitudinal and approximately parallel with the line of draft, and at all times in the median axial plane of mounting member 53. As shown best in Fig. 1, this rocker element 63 is provided with a forwardly projecting axially horizontal trunnion 64 rotatably mounted in a hub or boss 65 at the outer lower end of the casting which constitutes said mounting member 53.

The axis of the trunnion 64 is located centrally with relation to rocker 63 and extends generally in the direction of the draft line or center line of the implement so that when the trunnion is rocked on its axis from one side to the other in reversing the plow (by means later to be described), the rocking movement will be in a substantially vertical plane extending transversely of or substantially perpendicular to the line of draft.

Preferably in order to resist the sidewise thrust due to the plowing action, and to support the weight of the implement, two rolling elements are provided in the rear wheel system, one of these elements rolling on the land and the other element rolling upon the land side of the rear furrow. Although by some sacrifice of maximum efficiency in the rolling action these two rolling elements can be arranged to rotate on a common axis or as a unit, a better rolling action can be obtained by mounting the rolling elements in spaced apart relation on axes positioned at an angle to each other and respectively approximately parallel with the two surfaces of the ground upon which the wheels roll. This is the preferred arrangement which is illustrated in Figures 3 and 4 where the separate wheel elements 61 and 62 are mounted to rotate upon the bent-down ends 68 and 69 of a common axle 70 fixed in the rear end of the rocker 63 in such manner that the bent ends 68 and 69 of the axle 70 are positioned in a common vertical plane. The axis of wheel 6 is generally parallel with the surface 71 of the land as shown in Fig. 4 or generally parallel with the surface 72 of the land side of the furrow as shown in Fig. 3 when the rocker is in reversed position. Similarly, the wheel 62 which is mounted on axle end portion 69 will engage the land side of the furrow in the position shown in Fig. 4 and when the plow is reversed as in Fig. 3, said wheel 62 will engage the horizontal surface of the land.

It has already been explained that when the plow is reversed, the mounting or casting 53 being symmetrically mounted to shift sidewise relative to the axis 39 of the plow beam, will have the same relative position in respect of the center line of the implement in either plowing direction. The trunnion 63 will also rock on a horizontal axis extending centrally of the mounting 53 so that the trunnion 63 will also be moved transversely into positions on opposite sides of the center line of the implement when reversing the plow.

The means for rocking the trunnion symmetrically so as to reverse the angle of inclination of the axis of the rolling wheel system will now be described.

Referring to Fig. 2 it will be seen that there is welded or otherwise fixed to the side member 15 of the main frame of the implement an arm 73 on the end of which there is a vertical pin 74. A link 75 pivotally connects the pin 74 with a pin 76 adjustably fixed in an arm 77 which is integral with or otherwise fixed in relation to a flat hub member 78, bored out to rotate freely upon the rear plow standard 39. To the hub 78 there is rigidly connected a rearwardly extending arm 79 (see Figs. 3 and 4) so that in effect arms 77 and 79 form a bell crank pivoted on the shaft 39.

The rear end of the arm 79 of the said bell crank is turned down as shown at 80 and is secured to the correspondingly turned down end 81 of a brace arm 82 overlying arm 79 at an angle as shown best in Fig. 4. The inner end of arm 82 is welded to a small hub member 83 which is also bored out to fit and turn freely on the shaft 39. The turned down ends 80 and 81 of arms 79 and 82 are spaced apart and are bored out to receive the stem 84 (Fig. 1) of a fork 85 which is thereby pivotally connected to the arms 79 and 82 on a horizontal axis in a common plane with the center shaft 39.

The arms 86 and 87 of the fork 85 (returning to Figs. 3 and 4) support a bolt 88 which pivotally connects the fork 85 to the upper end of an arm or sleeve 89, the upper end of which is positioned between the sides 87 and 86 of the fork. The lower end of the sleeve 89 is a slidable and rotatable fit upon the pilot stem 90 extending upwardly into sleeve 89 and fixed in a bracket 91 carried by rocker 63. To allow the tilting of said rocker stem 89—90, required by reason of the arcuate movement of the rear end of arm 82 during the reversing operation, the bracket 91 is arranged to rock backward and forward on the rocker 63. This is shown best in Figures 3 and 4, where it will be seen that the lower end of the bracket 91 is made with a pair of spaced, depending lugs 91A and 91B, bored out so as to pivot on the outer ends of the central portion of the axle 70.

It will be understood that when the rearwardly extending arm 34 of the plow beam is swung into the reversed position shown in dotted lines in Fig. 2, the arm 77 which is pivoted on shaft 39 will assume the position shown in dotted lines by reason of the link 75 which connects said arm 77 to lug 73 on the fixed frame. Consequently, when this occurs, the arm 79 and its brace 82 will also swing in reference to the plow beam arm 34 and it will occupy the position shown in dotted lines in Fig. 2. The result of this reversing operation will be that the rocker 63 will be swung symmetrically upon its trunnion 64 which as hereinbefore stated is pivoted on a horizontal axis in the mounting 53, and the rear wheel system will be moved from the position shown in Fig. 4 to the position shown in Fig. 3. It will be observed that when shifting from right hand to left hand plowing, the rocker 63 will be swung in a counterclockwise direction (viewed from the rear) and in a clockwise direction when shifting from left to right hand plowing.

As previously stated, for best results in resisting the resultant force at the rear end of the plow, it is usually desirable that mounting 53 should deviate somewhat from a position exactly parallel to the path of movement of the plow, this is accomplished by the set screws or abutments 59 and arm 60, screws 59 being readily adjustable to hold arm 60 and mounting 53 in any desired angular relation to said path, less than parallel thereto, and the side thrust of the plow keeping the arm in contact with the abutment on the furrow side.

Changes in plowing depth or other conditions may dictate a change in inclination of axle 70 and adjustment of this inclination is readily provided by engagement of pivot 76 in one or another of the additional holes shown in arm 77, the further from standard 39 pivot 76 is placed, the less the inclination of axle 70, as will be apparent.

On account of the fact that in a reversible disc plow the direction of rotation of the disc on its axis is reversed when the direction of plowing is reversed, special problems are presented when it is desired to effect an efficient scraping of the disc in each of the plowing directions, I will now describe a scraping device which is equally efficient in either direction of plowing and has other advantages.

Each of the discs is similarly equipped with the same type of scraping device. The scraping device is supported from the standard or shaft which supports the disc, for example in Fig. 5 there is shown the front standard 38 which supports the disc 35. The scraping device is symmetrically disposed on the standard 38 in order that it may operate in substantially the same manner in either direction of plowing.

As will be seen from Fig. 5 and from Fig. 6 there is clamped on the stem of the standard a species of hub which includes a pair of small plates 92 and 93 shaped to fit the standard 38. These hub plates 92 and 93 are vertically spaced apart to receive the horizontally extending upper end 94 of a bent axle member 95, the lower end of whch extends downwardly at an angle as shown at 96. Said axle member 95 is located in the same vertical plane as the axis of the standard 38, and its arm 94 is welded to the inner sides of the hub plates 92 and 93. The hub plates 92 and 93 on either side of the arm 94 are also secured together by welding to their outer edges, on opposite sides of the standard 38, a pair of horizontal axially parallel bolts 97 the rear ends of which are threaded and extend through a yoke plate 98. The intermediate portion of said yoke plate is shaped to engage the rear surface of the standard 38.

When the nuts 99 on the ends of said bolts 97 are tightened, the shaft is clamped rigidly between the front hub plates 92 and 93, and said yoke piece 98, thereby securing said parts rigidly to the shaft or standard 38 which carries the disc. Said inclined axle member 96 is directed downwardly and rearwardly towards the center of the bearing which supports the disc. The scraper blade 100 is symmetrical about its center line which is in front of its supporting axle 96, and its plane is so inclined with reference to the axis of its supporting axle or shaft 96 as to ride substantially in contact, or in scraping relation to disc 35.

The scraper element 100 is mounted on said axle 96 by means of a small bracket which takes the form of a strip of steel 101 secured to the back of plate 100 by spaced bolts or rivets 102. Said strip 101 has its ends formed into an upper lug 103 and a lower lug 104 which are apertured to receive shaft 96 so that the said bracket can rotate on said shaft 96 and is capable of free sliding movement up and down on shaft 96 to the extent permitted by the spaced cotter pins 105.

As shown in Figs. 1, 5 and 6, the lower portion of the scraper blade 100 is cut substantially in the arc of a circle, the lower edge of which arc is located a short distance above the center of the disc. The width of the scraper element between its extreme edges or points is such that it will extend substantially the entire distance between the front edge and the rear edge of the disc. By means of the nuts 99 the scraper may be secured on the standard in such position that it may have a limited amount of sliding and rotary movement on the axle rod 96.

When the scraper is in operation and the disc is rotating in a counterclockwise direction as shown in Figs. 1 and 5, when viewed from the front of the implement, the dirt carried by the disc engages the lower edge of the trailing blade part 106 of the scraper element 100 and because of the inclination of plate 100, tends to rock the scraper as a whole around the axis of its supporting axle 96 so as to press blade part 106 against disc 35 in proper relation to scrape the dirt off of the disc and maintain it in condition to continue plowing. In view of the fact that a slight upward movement of the scraper on the shaft is also permitted and also may occur by reason of the upward movement of the soil by the disc, the blade will remain free on the axle 96 and because of the rocking movement the lower edge of the leading blade portion 107 will be moved out of scraping contact with the surface of the front part of the disc. In view of the fact that this scraper and its mountings are symmetrical, when the direction of plowing is changed the scraper will function in the same manner except in reverse. After a short period of operation the portions 106 and 107 will wear into a virtually perfect scraping contact with disc 35 so as to keep disc 35 properly cleaned to work efficiently in the soil.

The operation of the plow should be clear from the foregoing description, sufficient to say, the plow frame 13 is supported at its forward end on the tractor and at its rear end on the wheel system comprising the wheels 61 and 62, beam 26 being angled to one side or the other in accordance with the direction of plowing. For favorable cutting angle and clearance characteristics discs 35, 36 and 37 are angled by turning their respective standards 38, 27 and 39 an additional amount in beam 26. The side thrust resulting from the cutting action of the discs is taken in part on the tractor at an imaginary point determined by the intersection of links 20 and 21 extended and which point is substantially on the center line of the tractor rear axle so as to avoid any steering difficulties commonly known as "side draft." The major part of the side thrust is taken on the above-mentioned wheel system 61 and 62, the two wheels straddling the shoulder of the last or rear furrow, one running on the unplowed land and sustaining much of the weight of the rear end of the plow and the other sharply tilted against the furrow wall sustaining most of the side thrust of the rear end of the implement. When the furrow is complete, the outfit is turned around and the position of beam 26 reversed by means of the fluid motor 30 actuated from a source of pressure on the tractor. Swinging of beam 26, through the telescoping connection 50—51 swings discs 35, 36 and 37 through a slightly greater angle than that through which beam 26 swings thus placing the discs in an exactly equivalent but reversed position in relation to the plow frame so that, upon the return of the tractor an exactly similar plowing action will take place but throwing the soil in the reverse direction as related to the plow but in the same direction as related to the plowed land. Reversal of the position of beam 26, through connection 75 and arms 77 and 79 inclines the wheel system comprising wheels 61 and 62 into the opposite position to straddle and run on the newly formed furrow and resist the side thrust in the opposite direction. The degree of swinging of standard 27 is adjustable by changing the position of pin 18 and the exact trailing position of the wheel system is closely adjustable by shifting stops 59, the inclination of the wheel system being changeable by placing pivot 76 in different positions in lever arm 77. Scraper blade 100 is provided with a floating action and is symmetrical so that it will be caught by the soil carried by discs 35 and will have its trailing edge swung into contact with the rotating disc for effective scraping action, the operation being equivalent and similar for either direction of rotation of the discs.

Although shown and described with respect to particular apparatus, it will be readily apparent that various modifications may be made without departing from the principles of the present invention.

I claim:

1. A reversible disc plow implement having a frame, a rear wheel system carried by said frame and cooperating with the rear furrow to resist side thrust caused by the plowing operation, an arm swingable to and fro on said frame on a substantially vertical axis when the plow is reversed, a mounting for said rear wheel system pivoted on end of said arm on a substantially vertical axis shiftable in opposite directions transversely of the line of draft, said rear wheel system being rockable on said mounting on a longitudinal axis substantially parallel with the line of draft so as to reverse the angle of inclination of said wheel system to the furrow line when the furrow is reversed, the implement including means for limiting the pivotal movement of the mounting on the arm in accordance with the pivotal movement of the arm on the frame so as to maintain the rocking axis of the rear wheel system substantially parallel with the longitudinal axis, and means for positively rocking said rear wheel system on said mounting and around said longitudinal axis as an incident to the swinging of the arm.

2. A reversible disc plow having a frame and a rear wheel system which includes a rocker rockable back and forth on the frame in a path transverse to the vertical plane in which the line of draft is located, said wheel system also including a pair of separate ground wheels symmetrically spaced on opposite sides of the rocker axis and rotatable on said rocker on axes extending transversely of the line of draft so that the wheels are adapted respectively to roll upon the land and the land side of the furrow, and means positively operable as an incident to the reversal of the plow for rocking said rocker so as to change the positions of the wheels relative to the furrow and to the land, said wheel axes being approximately parallel with the land surface and the surface of the shoulder of the furrow respectively.

3. A tractor mounted reversible disc plow implement having a frame subject to side thrust when the plow is in operation and a pair of laterally spaced links pivoted on the frame for sideward swinging movement and pivotally connected with the tractor at laterally spaced points such that said links converge forwardly toward a single virtual hitching point on the tractor removed forwardly from the points of actual pivotal connection thereon, a side thrust resisting rear wheel system rockable back and forth about an axis parallel with the line of draft in a path extending transversely of the line of draft so as to reverse its angle of inclination to the furrow when the plowing discs are reversed to change the direction of plowing, and consequently the direction of said side thrust, is reversed, and means for reversing the inclination of said rear wheel system actuated as an incident to the reversal of the disc for positively rocking said rear wheel system about said axis (a) in a counter-clockwise direction (when viewed from the rear), when shifting from right hand to left hand plowing, and (b) in a clockwise direction when shifting from left to right.

4. A reversible disc plow implement having a frame, a rear wheel system carried by said frame and adapted to cooperate with the shoulder of the rear furrow to resist side thrust caused by the plowing operation in either direction, a plow beam swingable on said frame on a substantially vertical axis so as to reverse the plow discs, a castering mounting for said rear wheel system pivoted on the implement on a substantially vertical axis, stop means alternately effective in opposite plowing directions for limiting the castering movement of said mounting under the side thrust due to the plowing operation so as to maintain the rocking axis of the rear wheel system substantially parallel with the longitudinal axis when plowing, said rear wheel system being rockable on said mounting on a longitudinal axis substantially parallel with the line of draft so as to reverse the angle of inclination of said wheel system to the ground when the furrow is reversed, and means for positively rocking said rear wheel system on said mounting and around its longitudinal axis as an incident to the swinging of the beam.

5. A reversible disc plow implement having a main frame, a plow beam pivoted on said frame so that said plow beam may swing back and forth transverse to the line of draft, a rear wheel system rockable back and forth on the implement in a path transverse to the vertical plane in which the line of draft is located, said wheel system including a pair of circular ground-engaging elements adapted respectively to roll upon the land and against the wall of the furrow, the rocking of said wheel system serving to change the positions of said elements relative to the land and the furrow as an incident to the reversal of the plow, and means carried by the implement for positively effecting said rocking movement as an incident to the swinging movement of said beam on said frame.

6. A reversible disc plow which includes a main frame, a plow beam pivoted on said frame on a substantially vertical axis, a disc carried by the front end of said plow beam ahead of said axis, means for swinging said plow beam and said disc around said axis from side to side across the line of draft in order to reverse the plowing direction, a rocker pivoted on an axis parallel with the line of draft, a side thrust resisting rear wheel system on said rocker, and means for reversing said rear wheel system, actuated as an incident to the reversal of the disc for rocking said rear wheel system about said axis in a counter-clockwise direction (when viewed from the rear) when shifting from right hand to left hand plowing, and vice versa.

7. A reversible plow which includes a frame and a reversing member pivoted on said frame on a vertical axis, a rocker carried by said frame and pivoted on an axis parallel with the line of draft, wheel means on said rocker and engaging the wall of the rear furrow for holding the plow in line against side thrust, and means actuated in unison with said reversing member comprising a part extending upwardly from said rocker and an element extending rearwardly from said reversing member and engaging the upper end of said part for positively rocking said rocker on its axis through a predetermined angle as an incident to the reversal of the plowing direction so as to effect proper engagement between the wheel means and the furrow.

References Cited in the file of this patent

UNITED STATES PATENTS

| 1,149,720 | Brown | Aug. 10, 1915 |
| 1,165,267 | McKay | Dec. 21, 1915 |
| 1,455,687 | Walton | May 15, 1923 |
| 2,017,872 | Strandlund | Oct. 22, 1935 |
| 2,017,873 | Strandlund | Oct. 22, 1935 |
| 2,084,629 | Coviello | June 22, 1937 |
| 2,163,832 | Coviello | June 27, 1939 |
| 2,353,790 | Seaholm | July 18, 1944 |
| 2,635,522 | Oehler | Apr. 21, 1953 |
| 2,675,749 | Pursche | Apr. 20, 1954 |
| 2,730,940 | Rimple | Jan. 17, 1956 |
| 2,732,782 | Gurries | Jan. 31, 1956 |
| 2,765,723 | Clarke et al. | Oct. 9, 1956 |

FOREIGN PATENTS

| 275,320 | Switzerland | Aug. 1, 1951 |